United States Patent Office 3,491,172
Patented Jan. 20, 1970

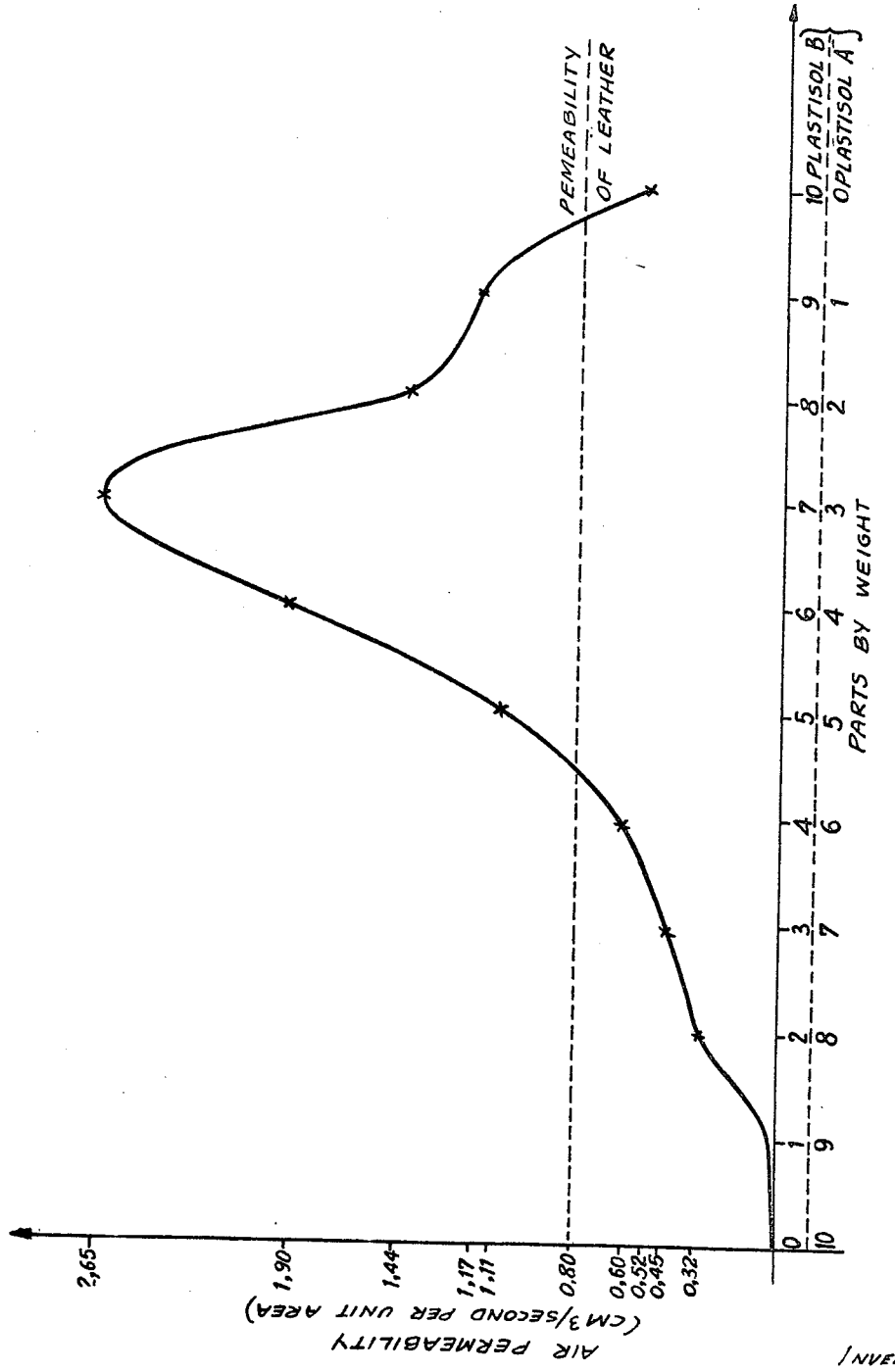

3,491,172
PROCESS FOR THE MANUFACTURE OF SHEETS OF POLYVINYL CHLORIDE PERMEABLE TO AIR, AND SHEETS OBTAINED BY THIS PROCESS
Louis Collez and Guy Chaintrier, Saint Die, France, assignors to Societe Anonyme Peltex, Marguerite-Saint Die, Vosges, France
Filed Sept. 8, 1966, Ser. No. 578,015
Claims priority, application France, Sept. 13, 1965, 31,251
Int. Cl. B29d 27/00
U.S. Cl. 264—47      4 Claims

ABSTRACT OF THE DISCLOSURE

Sheets of expanded polyvinyl chloride having an air permeability at least equal to that of leather are produced by forming a mixture of a polyvinyl chloride plastisol containing 2 to 9% by weight of a surface-active agent and 0.1 to 3% by weight of a porophoric agent, beating the mixture to form a mechanical foam, spreading out the mechanical foam thus obtained in a thin layer, and heating the thin layer to cause the porophoric agent to release gas. The combination of these two known pore-forming techniques produces much greater permeability to air than either technique alone.

---

The present invention concerns the manufacture of expanded sheets of polyvinyl chloride having air permeability at least equal to that of leather.

At the present time there are two processes for manufacturing expanded sheets of polyvinyl chloride: the first consists in adding to a standard plastisol of polyvinyl chloride, i.e. to a colloidal dispersion of vinyl resins in a plasticizing solvent, a porophoric agent capable of forming pores by the release of gases, for instance a swelling agent of the azodicarbonamide or azobisformamide type, to which a decomposition accelerator has been added. The paste obtained is spread out in a thin layer on a support to which it does not adhere, such as paper or siliconed cloth, then gelled in a furnace at 170° C. to 180° C. In the course of this hot gelling, the swelling agent decomposes, liberating an inert gas, and the gaseous release gives rise to internal cellules, though the latter are closed and the sheet obtained is impermeable to air; the second method consists in foaming the plastisol mechanically by beating, before it is spread out in the form of a sheet and gelled. The said mechanical foaming of plastisols is made possible by adding thereto a certain amount of stabilizing surface-active agent. These foams have intercommunicating, open cellules, but in the course of being spread out into a sheet by means of a scraper or the like, a surface layer that is to a greater or lesser extent smooth is produced, the pores of which are closed and remain closed after gelling, to such an extent that the sheet obtained is only very slightly permeable to air.

The aim of the present invention is to provide a process by which it is possible to obtain a sheet of expanded polyvinyl chloride with air permeability equal to or greater than that of leather, and in particular a sheet with air permeability that can be three times greater than that of leather. The invention has moreover the aim of providing such a process, by which it is possible to control the air permeability of the sheet obtained.

The process of the invention for obtaining a sheet of polyvinyl chloride permeable to air consists in combining a process of mechanical foaming of the paste before it is spread out in a thin layer, with a process of foaming by internal gaseous release in the course of the gelling of the said thin layer.

Accordingly the aim of the invention is a process for manufacturing an expanded sheet of polyvinyl chloride which consists in preparing a mixture of a plastisol with a porophoric agent and a stabilizing surface-active agent; in beating the mixture to bring about the formation of a mechanical foam; in spreading out the mechanical foam thus obtained in a thin layer and in bringing about the gelling of the said thin layer by heating to cause the release of gas by the porophoric agent.

It has been discovered surprisingly that whereas a sheet expanded by the gaseous release alone has air permeability that is practically nil and a sheet expanded by mechanical foaming alone has air permeability that is approximately only three quarters of that of leather, the sheet expanded by the process of the invention has much higher porosity, which can exceed three times that of leather. It is accordingly obvious that the process of the invention gives a result which differs entirely from the result that one could expect by simply adding the results of the two processes.

In accordance with the process of the invention, a comparatively slight addition of a swelling agent to a foamable mixture for mechanical foam, gives a rapid increase in the porosity.

In the process of the invention, and to define the result obtained and the possibility of regulating the porosity, it can be considered that the mixture employed is constituted by mixing a plastisol with the addition of a stabilizing surface-active agent for customary mechanical foaming, with a plastisol with the addition of a swelling agent or porophoric agent for customary chemical foaming. The process consists in using a mixture constituted of approximately 4 to 9.8 parts by weight of the mixture for mechanical foaming and approximately 0.2 to 6 parts by weight of the mixture for chemical foaming. Preferably, and to obtain maximum permeability, the mixture comprises approximately 6 to 8 parts by weight of the mixture for mechanical foaming and 2 to 4 parts by weight of the mixture for chemical foaming. By varying the proportions within the above limits and approaching the limit values, one can reduce the permeability to air of the sheet obtained.

As plastisols for carrying out the process of the invention, use can be made of any colloidal suspension of vinyl resins in pastes in a plasticizer, the best results obviously being obtained with special vinyl chlorides for mechanical foaming, for instance those sold under the trade names of "Goen 121," "Lucovyl PE 1800, PE 1801, PE 1100," Solvic 334," and so on, and as plasticizers, dioctylphthalate, butylbenzyl phthalate, di-butyl phthalate, di-octyl azelate polymer plasticizers, epoxidised plasticizers, epoxidised soya bean oil, and so on.

The stabilizing surface-active agent is selected from among known agents such as for instance that sold under the trademark "Fomade B" by the company Van Der Bilt.

As swelling agent, use is made of customary porophoric agents, in particular those releasing nitrogen upon decomposition, such as azodicarbonamide or azobisformamide, with an accelerator of decomposition, substances which are likewise known as stabilizing agents, such as organic salts of tin, compounds of lead and alkaline earth salts, it also being possible for these substances to be present already in the plastisol as stabilizers.

The mixture can also contain inert charges and colouring agents.

The process can be carried out by preparing the two plastisols independently, adding to one a swelling agent and to the other a stabilizing surface-active agent, and by mixing them before or in the course of the mechanical beating; but it is also possible to prepare the mixture by adding a swelling agent and a stabilizing surface-active agent to one of the plastisols.

The plastisol for mechanical foaming can contain 5% to 10% by weight of the surface-active agent and the plastisol for chemical foaming can contain 1% to 4% by weight of the porophoric agent, the final mixture being constituted of 4 to 9.8 parts by weight, preferably 6 to 8 parts by weight of the plastisol for mechanical foaming, and by 0.2 to 6 parts by weight, preferably 2 to 4 parts by weight, of the plastisol for chemical foaming.

It is also possible to prepare a plastisol containing 2% to 9% by weight, preferably 4% to 6% by weight of surface-active agent and 0.1% to 3% by weight, preferably 0.8 to 1.2% by weight of porophoric agent.

Various examples of the process of the invention are described below with reference to the accompanying drawing which is a graph of the air permeability of products obtained by varying the composition of the base mixture.

EXAMPLE 1

Using a mixer having Z-shaped vanes, known as a Werner mixer, two plastisols were prepared, one Plastisol A for chemical foaming, and one Plastisol B for mechanical foaming, having the following compositions:

Plastisol A

| | Parts by weight |
|---|---|
| Polyvinyl chloride for pastes (Geon 121) | 100 |
| Butyl-benzyl phthalate (type Santicizer 160 of Monsanto) | 40 |
| Di-octylphthalate | 30 |
| Epoxidised plasticizer (type Drapex 3–2 Argus) | 5 |
| Stabilizing "Quicker" barium/cadmium liquid (type Mark 229 Argus) | 0.5 |
| Titanium oxide | 0.5 |
| Azodicarbonamide (Ferrupore BZ M2 made into a 50/50 paste in di-octylphthalate | 6 |
| Colouring agent (Chromophthal of Ciba) | 1.5 |
| Total | 183.5 |

Plastisol B

| | Parts by weight |
|---|---|
| Polyvinyl chloride for pastes (Geon 121) | 100 |
| Butyl-benzyl phthalate (type Santicizer 160 of Monsanto) | 40 |
| Di-octylphthalate | 30 |
| Epoxidised plasticizer (type Drapex 3–2 Argus) | 5 |
| Stabilizing barium/cadmium liquid (type Mark 229 Argus) | 0.5 |
| Titanium oxide | 0.5 |
| Colouring agent (Chromophthal of Ciba) | 1.5 |
| Stabilizing surface-active agent (type Fomade B) | 14 |
| Total | 191.5 |

Nine mixtures of these two plastisols were prepared with respectively 1 to 9 parts of the Plastisol A, to 9 to 1 parts of the Plastisol B, and the said nine mixtures were beaten, as well as Plastisol A and Plastisol B, for three minutes by an electric whipper. The foams obtained were spread out by means of a scraper in the form of a layer of one millimeter thickness on siliconed paper. The foams were then gelled for 2.35 minutes under a battery of infrared lamps having a density of 25 kw. per square metre. After cooling, the sheets obtained were detached from their support and subjected to an air permeability test on a Shirley apparatus under a reduced pressure corresponding to 20 mm. water column. The rates of flow in cm.$^3$/sec. are shown in the ordinates in the graph of the drawings. By way of comparison the permeability of a leather is shown also in dashed lines.

From the results of these tests it can be seen that in the case of a mixture containing practically exclusively Plastisol A, air permeability is practically nil, that it increases progressively with increasing proportions of the Plastisol B, to exceed the permeability of leather for a ratio of approximately 5.5 parts by weight of Plastisol A to 4.5 parts by weight of Plastisol B; that it reaches a maximum value equal to approximately three times that of leather for three parts by weight of Plastisol A and 7 parts by weight of Plastisol B, and then decreases to reach approximately three quarters of the air permeability of leather with pure Plastisol B.

The conclusion is that maximum permeability is attained at approximately 0.9% to 1.1% by weight of azodicarbonamide and approximately 4.9% to 5.8% by weight of stabilizing surface-active agent of the type Fomade B, in the mixture of plastisol used.

EXAMPLE 2

A plastisol mixture having the following composition by weight was prepared:

| | Parts by weight |
|---|---|
| Polyvinyl chloride for pastes (Geon 121) | 100 |
| Butyl-benzylphthalate (Benzoflex) | 40 |
| Di-octylphthalate (Rhone-Poulenc) | 30 |
| Epoxidized Soya bean oil (type Paraplex G–62) | 5 |
| Stabilizing "Quicker" barium/cadmium liquid (Mark 229) | 0.5 |
| Titanium oxide | 1 |
| Azodicarbonamide (Ferrupore AZM2) | 2 |
| Colouring agent (Chromophthal of Ciba) | 2.5 |
| Inert charge (Micro Mica W1 of Adriss) | 10 |
| Stabilizing surface-active agent (Fomade B) | 11 |
| Total | 202 |

The mixture was beaten with an electric whipper and the foam was spread out in a fine layer and gelled as in Example 1.

The sheet obtained had excellent air permeability.

EXAMPLE 3

In the same way as in Example 2 a mixture of plastisol having the following composition was prepared and treated:

| | Parts by weight |
|---|---|
| Vinyl chloride for pastes (Solvic 334) | 100 |
| Polymer plasticizer (Plastolein 9730) | 15 |
| Di-octylazelate | 30 |
| Dibutylphthalate | 20 |
| Epoxidized Soya bean oil (Paraplex G–62) | 5 |
| Stabilizing dibasic phthalate of lead | 2 |
| Charge Micro-Mica (Adriss) | 12 |
| Azodicarbonamide (Ferrupore BZM2) | 1.9 |
| Stabilizing surface-active agent (Fomade B) | 10.3 |
| Total | 206.2 |

Again a sheet having excellent air permeability was obtained.

The ways described above for carrying the process are given by way of example only and can be subjected to numerous modifications without thereby going beyond the scope of the present invention.

What we claim is:

1. A process for the manufacture of sheets of polyvinyl chloride permeable to air, comprising forming a mixture of polyvinyl chloride plastisol containing 2 to 9% by weight of a surface-active agent effective to promote mechanical foaming and 0.1 to 3% by weight of a porophoric agent effective to promote foam formation upon heating, beating the mixture to bring about the formation of a mechanical foam, spreading out the mechanical foam thus obtained in a thin layer on a support, heating the thin layer to cause the porophoric agent to release gas, and removing the resulting layer from said support.

2. A process as claimed in claim 1, said surface-active agent being present in an amount 4 to 6% by weight of the whole.

3. A process as claimed in claim 1, said porophoric agent being present in an amount 0.8 to 1.2% by weight of the whole.

4. A process as claimed in claim 3, said surface-active agent being present in an amount 4 to 6% by weight of the whole.

References Cited

UNITED STATES PATENTS 2,689,374   9/1954   Toulmin _____ 264—50
2,894,855   7/1959   Wilhelm et al.

OTHER REFERENCES

Hansen, R. H. et al.: Novel Methods for the Production of Foamed Polymers, Nucleation of Dissolved Gas by Localized Hot Spots, Society of Plastics Engineers, Inc., p. 1, relied on.

JULIUS FROME, Primary Examiner

LEON GARRETT, Assistant Examiner

U.S. Cl. X.R.

264—45, 54